Figure 1:
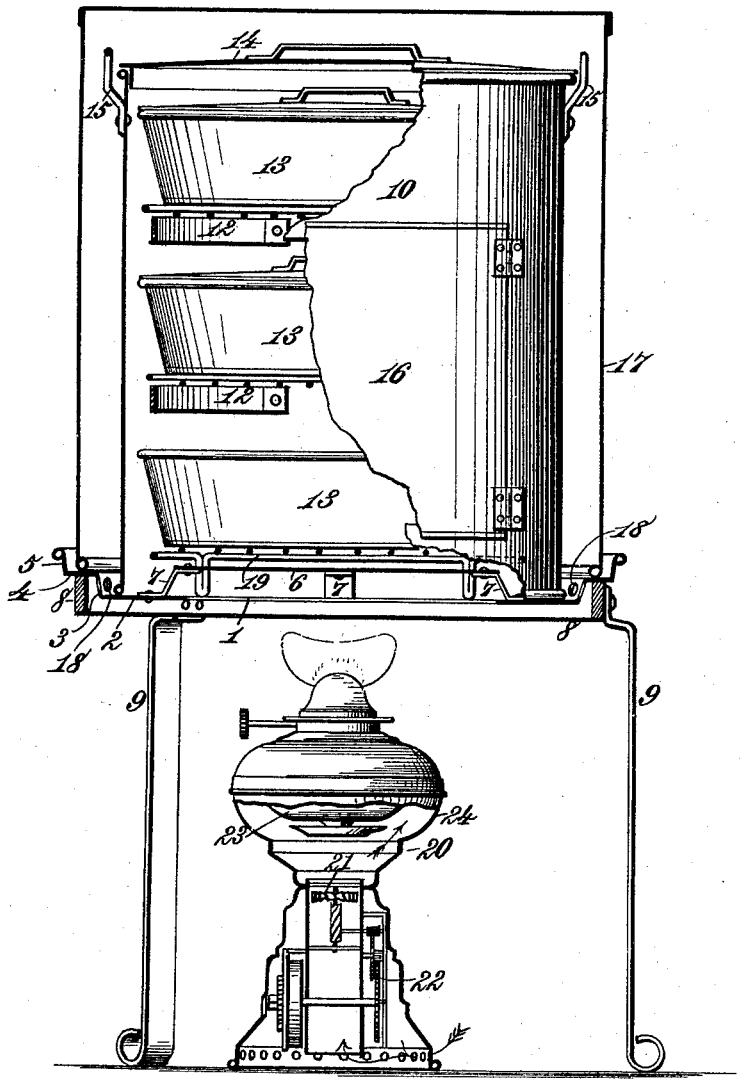

(No Model.)

H. FRICKER.
PROCESS, METHOD, OR ART OF COOKING EDIBLES.

No. 418,119. Patented Dec. 24, 1889.

Witnesses: Inventor.
Henry Fricker.
By James L. Norris
Atty.

UNITED STATES PATENT OFFICE.

HENRY FRICKER, OF LONDON, ENGLAND, ASSIGNOR TO FRANK L. WANZER, OF HAMILTON, CANADA.

PROCESS, METHOD, OR ART OF COOKING EDIBLES.

SPECIFICATION forming part of Letters Patent No. 418,119, dated December 24, 1889.

Application filed September 14, 1889. Serial No. 323,901. (No specimens.) Patented in England November 16, 1887, No. 15,734; in France December 20, 1887, No. 187,724; in Belgium December 21, 1887, No. 80,012; in Cape of Good Hope April 4, 1888; in Natal April 5, 1888, No. 13; in Spain September 10, 1888, No. 8,672; in Canada January 18, 1889, No. 28,376; in India January 23, 1889, No. 18; in South Australia January 25, 1889, No. 1,225; in Victoria January 25, 1889, No. 6,494; in New South Wales January 28, 1889, No. 1,209, and in Tasmania January 31, 1889, No. 655.

*To all whom it may concern:*

Be it known that I, HENRY FRICKER, a subject of the Queen of Great Britain, residing at London, England, have invented new and useful Improvements in the Process, Method, or Art of Cooking Edibles, (for which I have obtained patents in Great Britain, No. 15,734, dated November 16, 1887; in France, No. 187,724, dated December 20, 1887; in Belgium, No. 80,012, dated December 21, 1887; in Cape of Good Hope, dated April 4, 1888; in Natal, No. 13, dated April 5, 1888; in Spain, No. 8,672, dated September 10, 1888; in Canada, No. 28,376, dated January 18, 1889; in India, No. 18, dated January 23, 1889; in South Australia, No. 1,225, dated January 25, 1889; in Victoria, No. 6,494, dated January 25, 1889; in New South Wales, No. 1,209, dated January 28, 1889, and in Tasmania, No. 655, dated January 31, 1889,) of which the following is a specification.

It is the purpose of my present invention to provide a process or method of cooking and preparing edible substances to be used as food, whereby I obtain a marked improvement in quality and flavor and a considerable economy of the tissues, juices, and nutritive substances of the material operated upon.

It is the purpose of my invention to provide a process or method of cooking edible substances whereby food of different kinds may be prepared at the same time and in the same vessel, chamber, or container, and whereby each of the different substances treated shall be cooked thoroughly and delicately, rendered highly nutritious and easy of digestion, and all the qualities which impart rich flavor perfectly preserved, while every one of the different substances shall be thoroughly and properly cooked throughout, or from the outside to the center, without loss of nutrition and without acquiring from or imparting to any other substance simultaneously cooked in the same chamber any odor or flavor whatever.

It is my further purpose to provide a novel culinary process by which the several distinct processes of roasting, baking, boiling, and steaming, as applied to different edible substances, may all be carried on at the same time within the same containing-chamber and by the agency of the same heating and cooking medium, the results produced being uniformly successful without requiring previous experience or skill on the part of the operator, and being obtained at a mere nominal expense for fuel and without requiring special care or attention, the only services required on the part of the cook being to place the articles properly prepared in the containing-chamber, to set the heat-generator in operation, and to remove the edible substances at the end of a given period of time.

It is one characteristic feature of said invention that the edible substances operated upon may, if desired, be all placed in the cooking-chamber at the same time, subjected to the cooking process for the same period, and all removed together, each one thoroughly and properly cooked without being over or under done.

The invention consists in a process, method, or art of cooking meats, vegetables, and other articles of food by subjecting them in a cooking chamber or vessel to a temperature which increases gradually from a temperature below the point at which the cooking operation practically begins and to an atmosphere of dry heat produced by an exterior heat-creating agent and stored or housed within said chamber, whereby the articles of food are subjected to a gentle, persistent, and slowly-increasing bath-heat, which penetrates and permeates each of said articles.

The invention consists, secondly, in a process, method, or art of cooking meats, vegetables, and other articles of food by subjecting them in a containing-chamber to the action of a temperature gradually increasing from normal—that is to say, from a point below that at which the cooking process begins— and to an atmosphere of dry heat constantly produced therein by an exterior regulated heat applied to one part of said chamber, whereby a gentle, persistent, and slowly-increasing bath-heat is created within said chamber and housed or stored therein and caused to surround the articles of food or the vessels in which they are placed, thoroughly cooking every article of food, preserving and enhancing all the distinctive and characteristic flavors of each, retaining the essential juices, avoiding loss of nutrition and shrinkage in volume, and enabling an unskilled cook to prepare different kinds of food as well as a skilled operator can produce them by any of the methods now in use.

To enable others to practice my said invention, I will now proceed to describe the same in detail, reference being made to the accompanying drawings, in which I show one form of apparatus by which my invention may be practiced, and in which—

Figure 2:
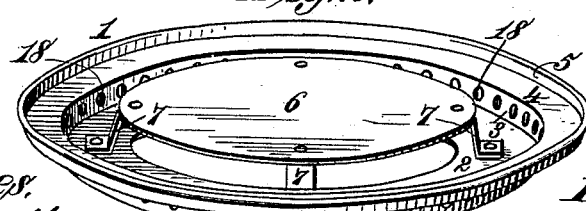

Figure 1 is a vertical central sectional view of an apparatus used in carrying out the invention, and Fig. 2 is a detail view of the bottom tray or pan.

In the drawings, the reference-numeral 1 denotes a tray or pan, having a bottom from which the central portion is removed, leaving an opening, which is surrounded by the annular flange 2, left by the removal of the central part of the bottom. Rising from this annular flange is a rim 3, having an annular portion 4, from which rises a narrow edge or rim 5. Overhanging the opening in the bottom is a plate or disk 6, supported on brackets 7 a little above the plane of the bottom portion or flange 2. The annular portion 4 rests upon a ring 8, to which legs 9 are pivotally attached in any suitable manner.

Upon the annular flange 2 and within the rim 3 rests a removable closed container 10, of nearly cylindrical form, this shape being the most convenient and capacious, though other forms may be used. This container is provided upon its interior with brackets or supports 12, adapted to support cooking or food-containing dishes 13. A removable cover 14 is applied to the open top, which is also provided with handles 15, to facilitate the removal of the container, and a door 16 is formed in its vertical wall to permit the insertion and removal of the dishes resting on the brackets 12. When the cover 14 is in place and the door 16 closed, the container is practically tight, the only opening communicating with the interior being that formed by the raised disk or plate 6 between said plate and the annular flange 2.

Resting on the annular portion 4 within the rim 5 is an outer containing vessel or casing 17, which is entirely closed and impermeable, save that ventilating-openings 18 are formed at suitable intervals in the rim 3 or in the annular portion 4, or at any suitable point or points within the edge of the outer container or jacket and between the same and the inner jacket. This outer casing is of such diameter that an air-space is formed between it and the inner jacket or container 10, and its height is such that a similar space is formed over the container 10 continuous with the annular air-space surrounding the same. A cooking-vessel 13 rests upon a separate support or grid 19, by which it is raised somewhat above the plate or disk 6, leaving a suitable space between said plate and the bottom of the vessel. This construction enables the several vessels to be inserted and removed without difficulty. The uppermost vessel 13 may be removed or inserted through the top of the container 10, while the central vessel is inserted and removed through the door 16. The lower vessel is inserted and removed by raising the container off the bottom or central portion of the pan. The heat is thus permitted to freely circulate through all parts of the container and upon every side of each one of the food-containing vessels. A heat-generator 20 is then placed beneath the pan or tray and ignited. This heat-generator consists, preferably, of a lamp burning paraffine or other similar oil in which the combustion is aided and intensified by a forced draft produced by a small fan 21, revolved by an ordinary train of clock-gearing 22. This fan, with its operating mechanism, is placed in the base of the lamp and the current of air produced is drawn through air-apertures in the lamp-standard and passes upward between the oil-reservoir 23 and the outer wall 24 of the lamp to the point of combustion, producing a brilliant flame, thoroughly consuming all the products of combustion and giving a gentle regulated heat, which is easily and accurately regulated by the devices raising and lowering the wick. The flame acts directly upon the raised plate or disk 6, which practically forms part of the inner containing-vessel when the parts are in place, and which radiates the heat it acquires to the interior of the container 10, a certain percentage of heat also entering through the open bottom or between the bottom flange 2 and the edge of the plate 6. The heat thus generated rises in the inner containing-vessel and penetrates every part thereof, creating a mild but persistent and slowly-increasing bath-heat within the said inner container, which is stored or husbanded therein, the loss by radiation being small, owing to the outer insulating casing or jacket. The action of the heat-generator, after the height of the wick and the size of the flame have been duly adjusted, proceeds constantly and uniformly, or substantially so, and the comparatively gentle and regulated heat produced thereby creates a gentle, persistent, and gradually-increasing bath-heat in the cooking-chamber, which surrounds all the edible substances or the vessels containing the food, and is readily absorbed by said substances. As the process continues the interior heat gradually increases by reason of the continued action of the generator and the storing of the heat in the container, and this heat is continually absorbed by and penetrates the substance of the several materials contained in the dishes or vessels, the bottom and side of which are perfectly tight or without opening in their walls. They may be used with or without covers. This gentle and slowly-increasing bath-heat penetrates every atom of the vegetable and animal tissues exposed thereto, cooking each article of food evenly throughout and retaining in each its peculiar and characteristic flavors and nutritious qualities without communicating to any of the others any odor or taste.

The process considered as an entirety presents the following characteristic features: The food of whatever kind is placed within a chamber, which is not necessarily raised to a given temperature prior to its introduction. The heat-generator then acts upon the radiating-plate of the bottom tray, creating within a mild but gradually-increasing bath-heat, which surrounds the food-containing vessels on every side. As the interior temperature rises to between 120° and 140° Fahrenheit, the cooking process begins and the albumen of the food gradually coagulates. This coagulation extends at first only to that superficial stratum or outer thick layer through which heat at the temperature producing coagulation has thus far penetrated; but as the process continues the penetration and permeation of the persistent bath-heat extends inward, gradually approaching the core or center. By the gradual coagulation of the albuminous particles they are converted into a soft, tender substance which is an excellent conductor of heat, thereby promoting the penetration of the bath-heat. Moreover, by the gradual and persistent action of this heat a certain small percentage of the water contained in meat is slowly evaporated, allowing a gradual contraction in volume of the tissues, instead of suddenly and violently squeezing out the essential juices and most nutritious constituents, as might happen where meat is introduced within a highly-heated oven or chamber. Thus the only substance expelled from the food by this process is a portion of the water normally contained therein, every particle of the rich nourishing and flavoring juices and essences being retained.

Some variations in the structure of the apparatus may be made without defeating the purposes in view—as, for example, the bottom tray may be wholly closed, cutting off all direct communication with the interior of the inner container 10. The results thereby obtained, however, are less perfect, and the construction shown in the drawings is decidedly preferable. When the open tray shown is employed, there is practically very little, if any, escape of heat from the interior, and not the slightest odor is given off by the food. The explanation of this fact is found in the low substantially uniform regulated heat, by which the interior temperature ascends gradually, and no faster than it can be easily and naturally absorbed by the articles of food in quantities suitable for the purpose in view, allowance being made for the small loss by radiation. For this reason none of the essential juices are evaporated, the tissues are not suddenly and violently contracted, nor are the nutritious essences of meat squeezed out and dissipated by the heat.

I am also able to roast frozen meat without previously thawing it and to roast the same thoroughly and uniformly without loss of nutrition, which has been heretofore wholly impossible by any process capable of being practiced by a stove or range. In operating upon frozen meats, which are placed in the cooking-chamber while frozen hard, the action of the bath-heat is so mild, and yet so persistent, that it thaws the meat and so gently penetrates its tissues as to expel the frost and coagulate the albuminous matter without violently contracting the tissues. Thus the juices and essential constituents of the meat are practically sealed up in the mass, while the conductivity of the coagulated atoms of albumen facilitates the further penetration of the heat and the completion of the process, as has been already set forth.

I avoid the absorption of odors given off by the different articles or food substances cooked by this process by reason of the fact already stated that the temperature within the cooking-chamber rises so gradually that it is readily absorbed by the meats and vegetables subjected thereto, in contradistinction to those processes wherein the same food substances are subjected to a temperature in excess of that which they are able to absorb, whereby a certain proportion of the volatile constituents of the said substances is driven off, creating more or less loss of nutrition and producing odors which are unavoidably absorbed by the other substances present in the same cooking-chamber.

The entire absence of intercommunicated odor in the cooked food, as well as during the process of cooking, indicates that the ingredients from which said odors ordinarily proceed are conserved and retained in the substances or tissues of the food, instead of being dissipated with the steam and vapor expelled from said tissues by excessive heat.

A characteristic feature of my invention consists in the fact that the food substances are subjected to a temperature which gradually increases from a normal point up to the maximum heat which the apparatus is capable of generating when heat-absorbing food is present in the cooking-chamber.

By the term "normal" I do not necessarily imply that the starting temperature within the cooking-chamber is the same as that outside it; but I intend that said term shall signify a temperature below that at which the process of cooking practically begins.

What I claim is—

1. The process, method, or art, substantially as hereinbefore set forth, of cooking meats, vegetables, and other articles of food, which consists in subjecting said articles in a cooking vessel or chamber to a temperature gradually increasing from normal and to an atmosphere of dry heat generated by an outer heat-creating agent, whereby said articles are subjected to the action of gentle, persistent, and slowly-increasing bath-heat, which is housed or husbanded in the cooking-chamber, substantially as described.

2. The process, method, or art, substantially as hereinbefore set forth, of cooking meats, vegetables, or other articles of food, which consists in subjecting said articles in a cooking chamber or vessel to a temperature gradually ascending from a normal point, and to an atmosphere of dry heat constantly produced therein and generated by a gentle regulated exterior heat applied to one part of said chamber, whereby a mild, persistent, and slowly-increasing bath-heat is produced and housed within said chamber and caused to act upon the articles placed therein, substantially as described.

In testimony whereof I have affixed my signature in presence of two witnesses.

HENRY FRICKER.

Witnesses:
RICHARD CORE GARDNER,
 166 *Fleet Street, London, England.*
ALBERT E. DECKER,
 209 *Upper Thames Street, E. C.*